US007883259B2

(12) United States Patent
Hung et al.

(10) Patent No.: US 7,883,259 B2
(45) Date of Patent: Feb. 8, 2011

(54) BACKLIGHT MODULE

(75) Inventors: Yu-Min Hung, Hsin-Chu (TW);
Chih-Lang Chiu, Hsin-Chu (TW);
Yun-Hsien Chou, Hsin-Chu (TW);
Tsai-Fen Lee, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 162 days.

(21) Appl. No.: 12/436,140

(22) Filed: May 6, 2009

(65) Prior Publication Data

US 2010/0149836 A1    Jun. 17, 2010

(30) Foreign Application Priority Data

Dec. 12, 2008    (TW) ............... 97148500 A

(51) Int. Cl.
*F21V 7/04*    (2006.01)
(52) U.S. Cl. .................. 362/634; 362/633; 349/58; 349/65
(58) Field of Classification Search .......... 362/632, 362/633, 634; 349/58, 65
See application file for complete search history.

(56) References Cited

U.S. PATENT DOCUMENTS

| 7,070,315 | B2* | 7/2006 | Choi ................. 362/628 |
| 7,172,329 | B2* | 2/2007 | Kao et al. ............ 362/633 |
| 7,782,418 | B2* | 8/2010 | Ke et al. ............. 349/58 |
| 2006/0098459 | A1 | 5/2006 | Kao et al. |

FOREIGN PATENT DOCUMENTS

| CN | 1371018 A | 9/2002 |
| CN | 1371021 A | 9/2002 |
| CN | 1779520 A | 5/2006 |
| CN | 1866110 A | 11/2006 |
| TW | I266933 | 11/2006 |

* cited by examiner

*Primary Examiner*—Stephen F Husar
(74) *Attorney, Agent, or Firm*—Winston Hsu; Scott Margo

(57) ABSTRACT

A holder is disposed at a side of a back light module adjacent to a light incident side of a light guide plate (LGP). A light source module is fixed on a wall of the holder that faces the light incident side. A holder engager on a side wall of the LGP engages with an LGP retainer of the holder. When the LGP expands or contracts due to changes of temperature, the holder and the light source module move with the side of the LGP, thereby a gap between the light source module and the light incident side is maintained and the luminance of the backlight module is stabilized.

19 Claims, 6 Drawing Sheets

BACKLIGHT MODULE

BACKGROUND OF THE INVENTION

1. Field of the Invention

The present invention relates to a backlight module, and more particularly, to a backlight module capable of utilizing a holder to maintain a gap between a light emitting diode light bar and a light incident side of a light guide plate.

2. Description of the Prior Art

In a side-light type backlight module, in order to fix and position optical components, such as a light guide plate (LGP), on a back plate, a mechanism used for fixing the optical components is often designed on the back plate whereon the optical components and a light source are disposed. The light source can be a light emitting diode module or a cold cathode tube. For example, Taiwan patent No. I266933 discloses an improvement of utilizing a plurality of salient blocks of the optical components to engage with a positioning component of the back plate for fixing and positioning the optical components. A positioning groove can be formed between adjacent salient blocks. The positioning component includes an inner wall and two side walls at least. A light source of the backlight module, such as a light emitting diode, can be disposed on the back plate. The mechanism used for fixing the optical components on the back plate is often disposed on a center of a lateral side of the optical component so as to achieve a preferred effect for fixing and positioning.

However, the light emitting diode of the backlight module is often disposed on a light incident side of a light guide plate, with a gap between the light emitting diode and the light incident side of the light guide plate. In order to increase efficiency of the light emitting diode, the gap should be reduced as possible as it could. It means that the gap between the light emitting diode and the light incident side of the light guide plate influences luminance and uniformity of the backlight module. While the light emitting diode and the light incident side of the light guide plate are entirely closed, that is the gap approaches to zero, the light emitting diode has the best incident efficiency. The incident efficiency decreases while the gap is increased. For example, if the gap is increased from 0 mm to 1 mm, luminance of the backlight module is reduced to 90%. However, it is quite difficult to reduce the gap between the light emitting diode and the light incident side of the light guide plate to 0 mm in mass production. Therefore, the gap between the light emitting diode and the light incident side of the light guide plate is usually controlled within 0.3 mm.

Please refer to FIG. 1. FIG. 1 is a cross-sectional diagram of a light emitting diode light bar 2 disposed on a lateral side of a light incident side $I_0$ of a light guide plate 1 of a side-light type backlight module in the prior art. The light guide plate 1 and the light emitting diode light bar 2 are both disposed on a back plate 3. In a testing process of environmental temperature variation of the backlight module, the light guide plate 1 suffers the temperature variation from 0° C. to 60° C. In a transport process of the backlight module, the light guide plate 1 suffers the temperature variation from 0° C. to 50° C. Linear thermal expansion coefficient of the ordinary light guide plate 1 is around $83/(10^6 K)$. For example, length of a lateral side $S_0$ of a 20 inch display panel is around 445 mm. If the 20 inch display panel suffers the temperature variation of 25 degrees in centigrade, length of the lateral side $S_0$ of the light guide plate 1 expands to 445.92 mm. However, for the conventional backlight module, there is no mechanism capable of fixing a gap $H_0$ between the light incident side $I_0$ of the light guide plate 1 and the light emitting diode light bar 2 in a direction whereto the light guide plate 1 expands. Therefore, the light emitting diode light bar 2 is pressed by expansion of the light guide plate 1 so as to withdraw the light emitting diode light bar 2 from an original position. After the temperature variation of the light guide plate 1 is reduced, the light emitting diode light bar 2 can not be moved back to the original position due to deformation of the mechanism used for fixing the light emitting diode light bar 2 or the light guide plate 1. The gap $H_0$ between the light emitting diode light bar 2 and the light incident side $I_0$ of the light guide plate 1 is increased to a gap $H_0'$. Difference between $H_0'$ and $H_0$ might reach to 0.92 mm at most so as to reduce the incident efficiency of the light emitting diode light bar 2 emitting light to the light incident side $I_0$ of the light guide plate 1, and luminance of the backlight module is reduced to 90%.

SUMMARY OF THE INVENTION

According to the present invention, a backlight module comprises a back plate comprising a fixing component, a light guide plate comprises a light incident side, and a lateral side connected to the light incident side, the lateral side comprises a back plate fastening component (a first fastening component) for engaging with the fixing component of the back plate so as to fix the light guide plate on the back plate, and a holder fastening component (a second fastening component) connected to the back plate fastening component, a holder disposed between the back plate and the light guide plate and comprising a retainer for engaging with the holder fastening component of the light guide plate so as to limit displacement of the light guide plate, and a fixing component connected to the retainer, and a light source module fixed on the fixing component of the holder, a gap being formed between the light source module and the light incident side of the light guide plate.

According to the present invention, a flat display device comprises a backlight module comprises a back plate comprising a fixing component, a light guide plate comprises a light incident side, and a lateral side connected to the light incident side, the lateral side comprises a back plate fastening component (a first fastening component) for engaging with the fixing component of the back plate so as to fix the light guide plate on the back plate, and a holder fastening component (a second fastening component) connected to the back plate fastening component, a holder disposed between the back plate and the light guide plate and comprising a retainer for engaging with the holder fastening component so as to limit displacement of the light guide plate, and a fixing component connected to the retainer, and a light source module fixed on the fixing component of the holder, a gap being formed between the light source module and the light incident side of the light guide plate, a reflector disposed between the back plate and the light guide plate, and a display panel disposed corresponding to the backlight module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
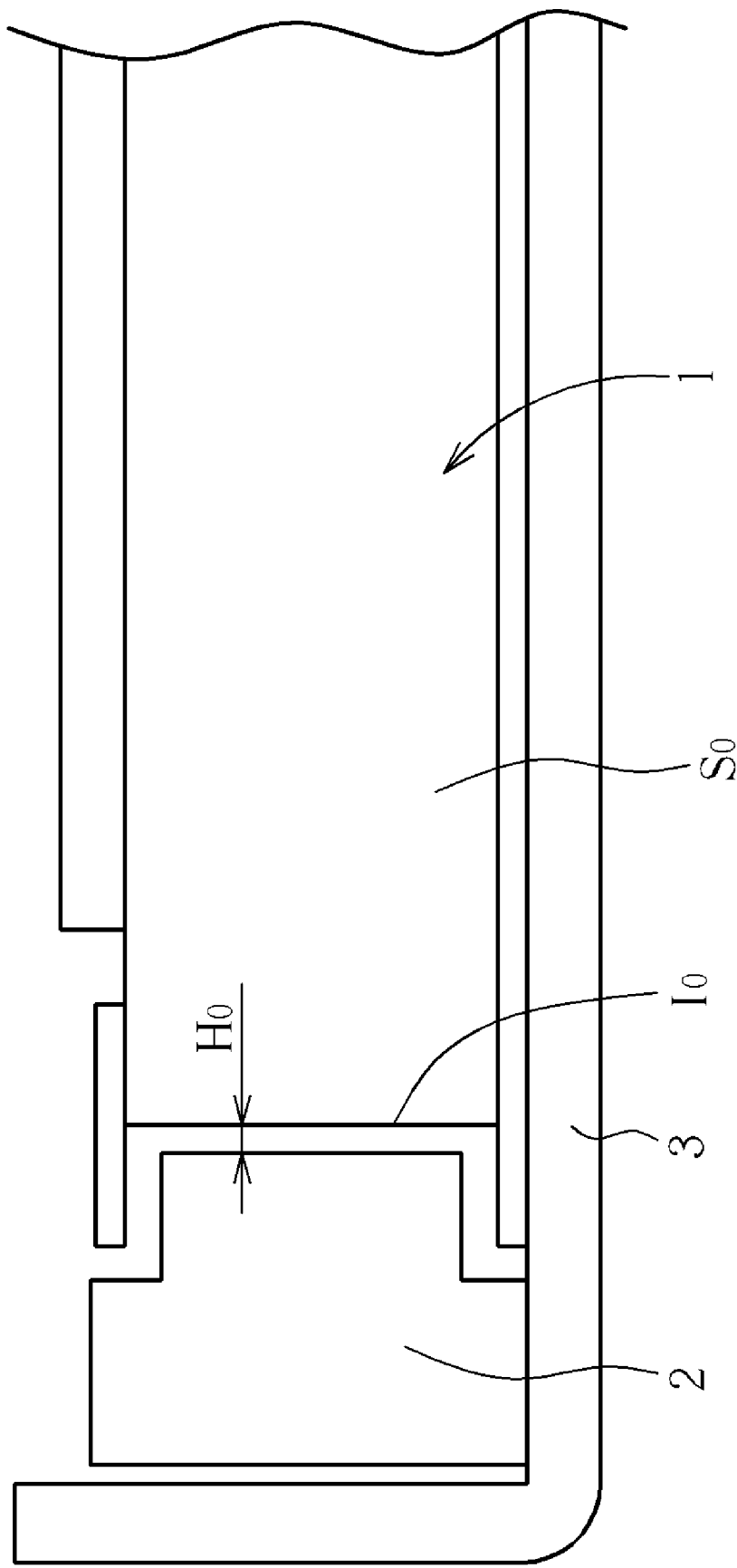
FIG. 1 is a cross-sectional diagram of a light emitting diode light bar disposed corresponding to a light incident side of a light guide plate of a side-light type backlight module in the prior art.
Figure 2:
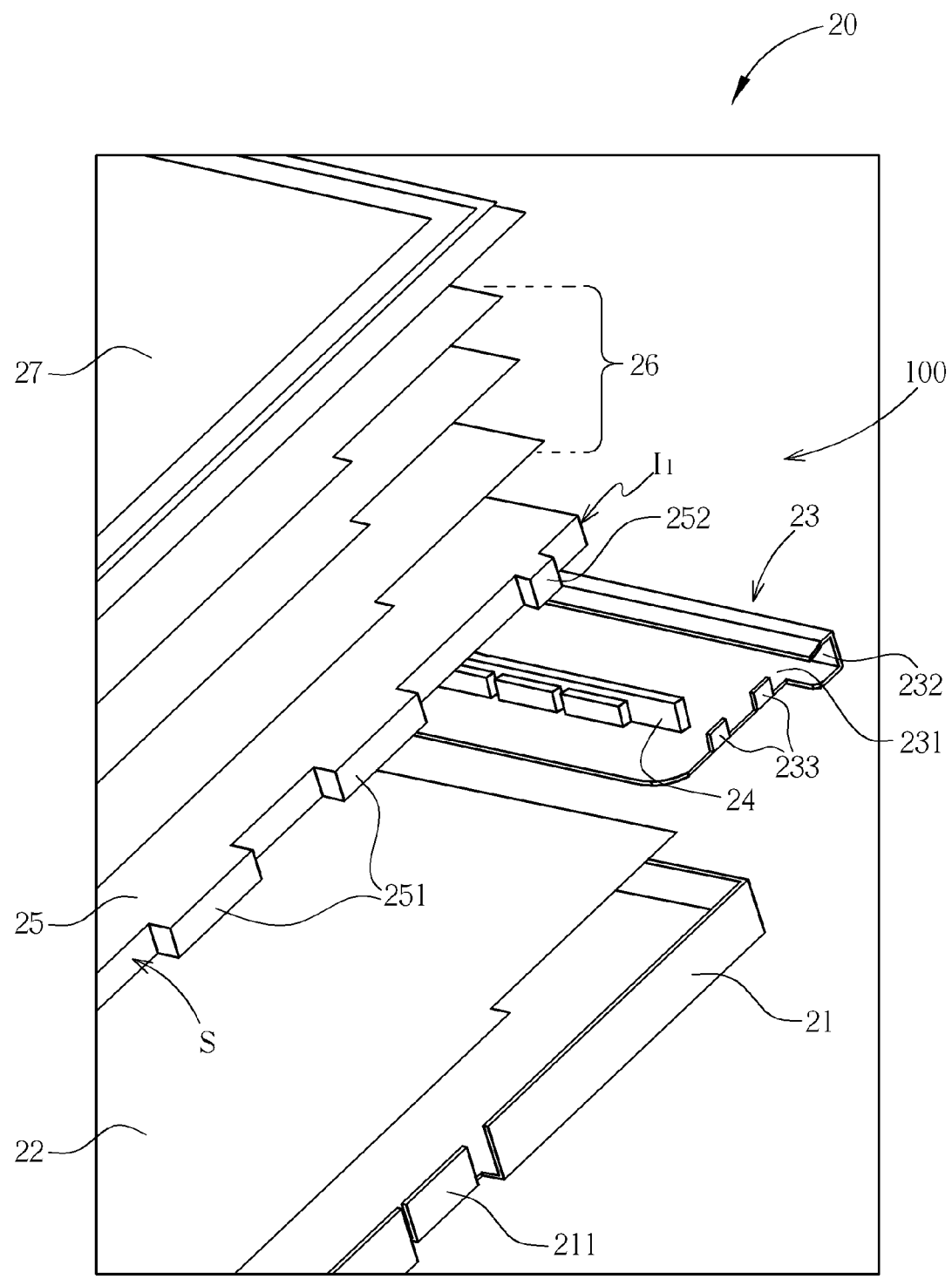
FIG. 2 is a partial diagram of a flat display device according to a first embodiment of the present invention.

Please refer to FIG. 2. FIG. 2 is a partial diagram of a flat display device 20 according to a first embodiment of the present invention. The flat display device 20 includes a back plate 21, a reflector 22, a holder 23, a light source module 24, a light guide plate 25, a plurality of optical films 26, and a display panel 27. The back plate 21, the reflector 22, the holder 23, the light source module 24, the light guide plate 25, and the plurality of optical films 26 form a backlight module 100. The reflector 22 is disposed between the light guide plate 25 and the back plate 21. The back plate 21 is for fixing and containing other components of the flat display device 20. The back plate 21 can be a metal casting made of aluminum or aluminum alloy material, and also can be a plastic casting made of polymer having reflection property, such as polymethyl methacrylate (PMMA) material. Functions and dispositions of the reflector 22, the optical films 26, and the display panel 27 are well known in the art, and are not described in detail.

A fixing component 211 is formed on a side of the back plate 21. The fixing component 211 can be a winding structure or a cutting structure, and also can be an indentation structure or a protruding structure formed on the side of the back plate 21. The light guide plate 25 can be made of transparent light guide material, such as PMMA, with injection molding technique so as to form as a wedge-like block or a rectangular-like block having meshes or patterns on the surface. The wedge-like block and the rectangular-like block are similar to a wedge block and a rectangular block respectively, but there are engaging components, such as flanges or indentations, formed on sides of the wedge block and the rectangular block. The light guide plate 25 includes a light incident side $I_1$ and a lateral side S connected to the light incident side $I_1$. A first fastening component 251 and a first flange 252 (or a second fastening component) are formed on the lateral side S. In this embodiment, the first fastening component 251 of the light guide plate 25 and the fixing component 211 of the back plate 21 are formed as an engaged wedge structure or an engaged rectangular structure. For example, the first fastening component 251 can be the wedge structure or the rectangular structure, and the light guide plate 25 can be fixed and positioned on the back plate 21 via engagement of the first fastening component 251 with the fixing component 211.

Figure 3:
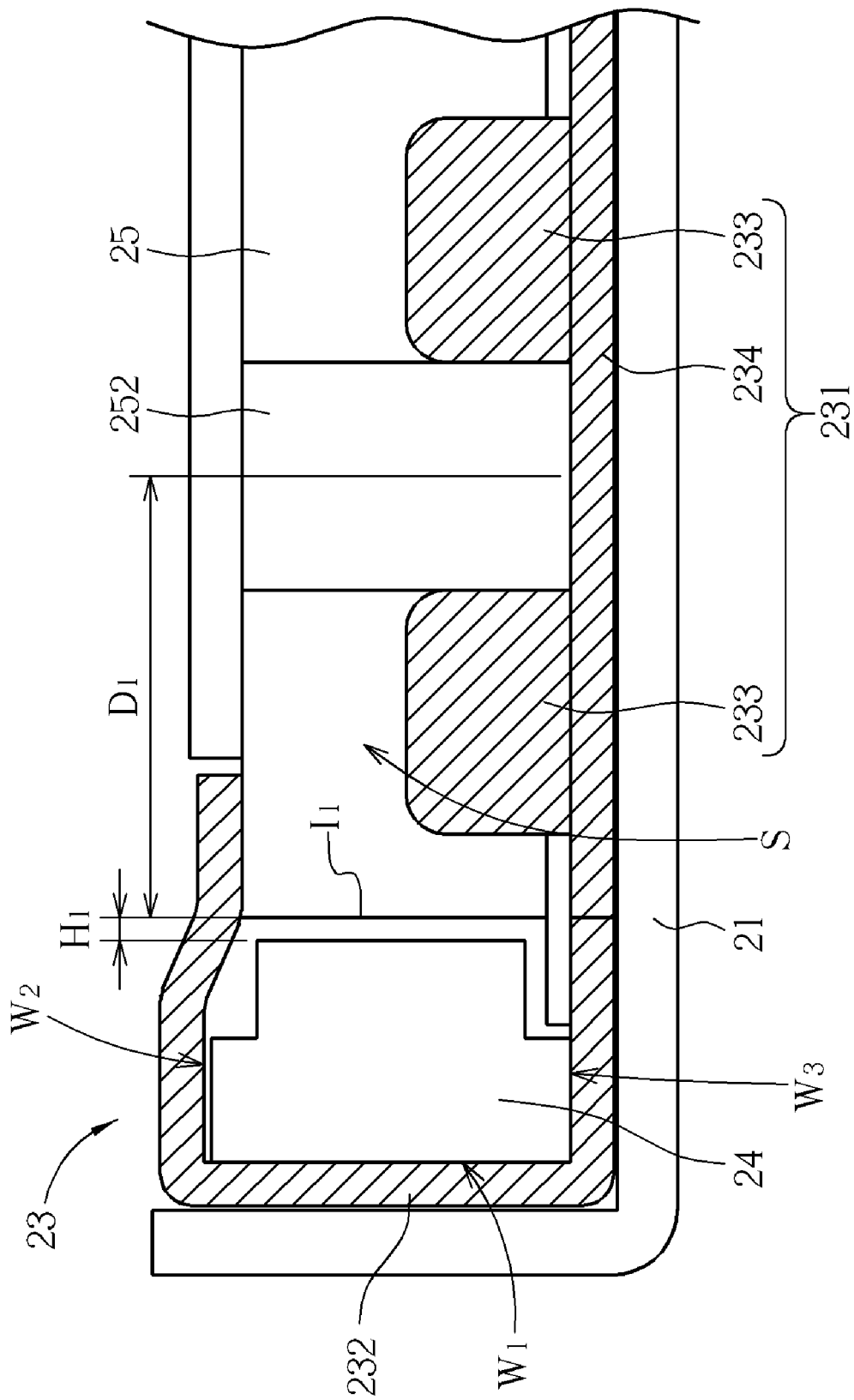
FIG. 3 is a cross-sectional diagram of a holder, a light guide plate, and a light source module of a backlight module according to the first embodiment of the present invention.

Please refer to FIG. 3. FIG. 3 is a cross-sectional diagram of the holder 23, the light guide plate 25, and the light source module 24 of the backlight module 100 according to the first embodiment of the present invention. The backlight module 100 utilizes the holder 23 to fix a gap $H_1$ between the light guide plate 25 and the light source module 24 so as to solve a problem of the variation of the gap $H_1$. The gap $H_1$ varies because the light source module 24 is pressed by the light guide plate 25 that expands while the temperature rises. The holder 23 includes a first baffle 231 (or a retainer) and a fixing component 232. The first baffle 231 includes a base plate 234 and two first bending parts 233 stretched from the base plate 234. While the holder 23 is disposed adjacent to the light incident side $I_1$ of the light guide plate 25, the first bending parts 233 are placed on the lateral side S of the light guide plate 25, and the first flange 252 of the light guide plate 25 is engaged with the first bending parts 233. Therefore, the light guide plate 25 is constrained by the first baffle 231 of the holder 23 so as to reduce relative displacement between the light source module 24 and the light guide plate 25. In addition, the holder 23 and the light source module 24 not only can be fixed on the back plate 21, but also can be disposed on the back plate 21 in a slidable manner.

In this embodiment, the light source module 24 can be a light emitting diode light bar fixed inside the fixing component 232 of the holder 23. The fixing component 232 can be a U-shape bending part or a groove-shape bending part, and includes three walls W1, W2, and W3 respectively facing the light incident side $I_1$ of the light guide plate 25 and two sides being perpendicular and adjacent to the light incident side $I_1$ respectively. Then the light source module 24 is fixed in the holder 23, and the light source module 24 is not limited fixed on the vertical surface or vertical wall W1 of the holder 23. The light source module 24 also can be fixed on the horizontal surfaces or horizontal walls W2 and W3 of the holder 23. It is depended on which kinds or types of the light source module 24 or LED chosen. Therefore, the light source module 24 can be fixed on the wall W1 or on another walls W2 and W3 connected the wall W1 by gluing, attaching, engaging, or other methods. Therefore, the light source module 24 is constrained inside the holder 23 of the backlight module 100 for preventing relative displacement corresponding to the light guide plate 25. That is to say, while the light guide plate 25 expands or contracts due to the temperature variation, the holder 23 and the light source module 24 can be moved with the light guide plate 25 simultaneously so as to maintain the gap $H_1$ between the light source module 24 and the light incident side $I_1$ of the light guide plate 25 stably.

Figure 4:
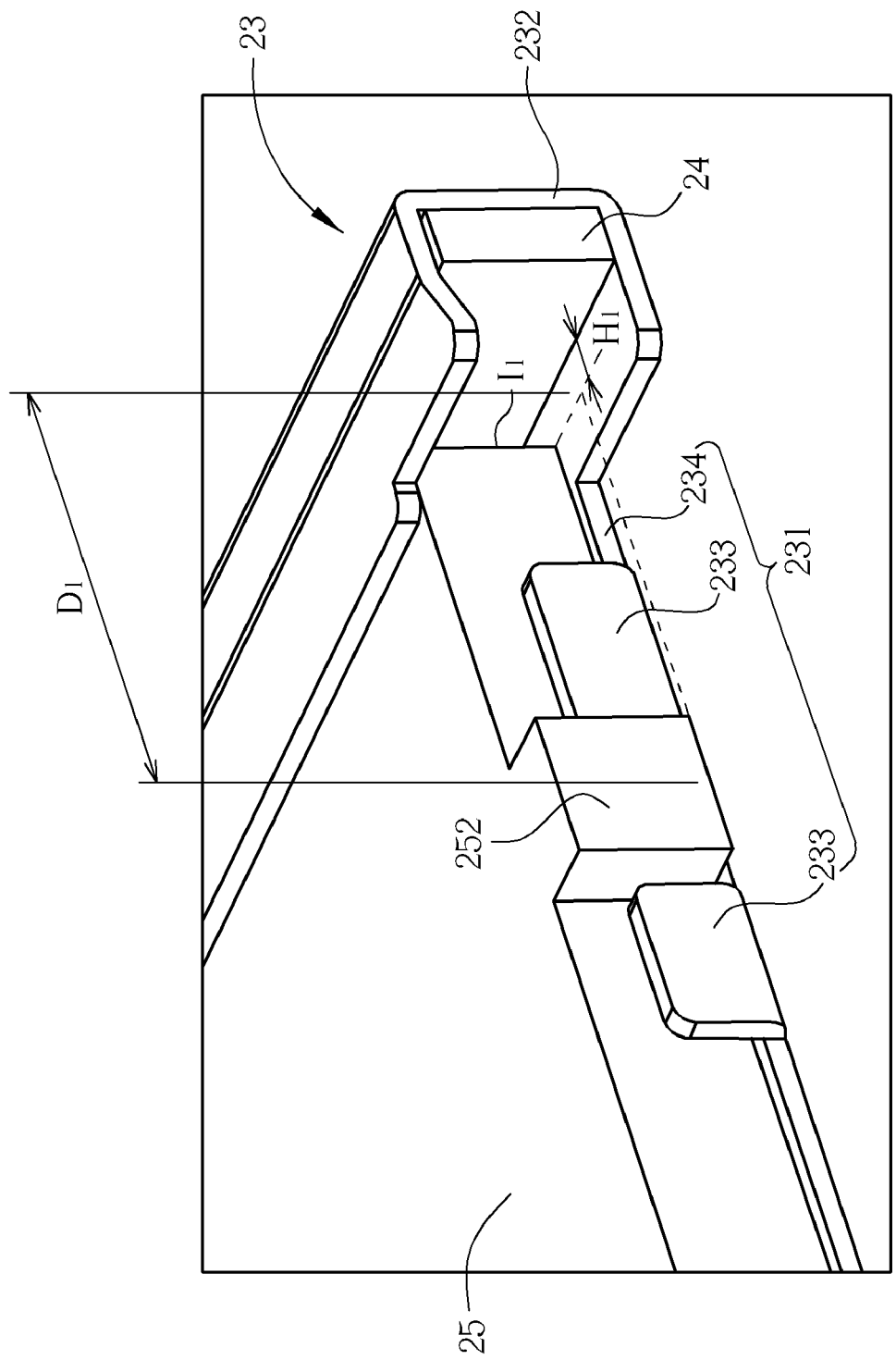
FIG. 4 is a partial diagram of the backlight module according to the first embodiment of the present invention.

Please refer to FIG. 4. FIG. 4 is a partial diagram of the backlight module 100 according to the first embodiment of the present invention. In this embodiment, the holder 23 is utilized for fixing the light incident side $I_1$ of the light guide plate 25 and the whole light source module 24 so that the gap $H_1$ between the light incident side $I_1$ of the light guide plate 25 and the light source module 24 is maintained constantly. A range of the gap $H_1$ is between 0.03 mm and 0.3 mm in this embodiment. The first fastening component 251 of the light guide plate 25 is also fixed on the fixing component 211 of the back plate 21, as illustrated in FIG. 2. The first flange 252 (or the second fastening component) of the light guide plate 25 is configured between the first fastening component 251 and the light incident side $I_1$, and locates near the light incident side $I_1$. The first bending parts 233 of the first baffle 231 (or the retainer) of the holder 23 are engaged with the first flange 252 near the light incident side $I_1$, so that locates near the fixing component 232 and is connected to the fixing component 232 through the base plate 234 of the first baffle 231.

Therefore, while the flat display device 20 suffers enormous temperature variation in a testing process or a transport process, the holder 23 can be used for maintaining the gap $H_1$ between the light incident side $I_1$ of the light guide plate 25 and the light source module 24. In this embodiment, there is a minimum distance $D_1$ between centerline of the first flange 252 and the light incident side $I_1$, and a range of the minimum distance $D_1$ is between 7 mm and 70 mm. A range of linear thermal expansion coefficient of the light guide plate 25 made of polymer material, such as PMMA, is between $80/(10^6 K)$ and $85/(10^6 K)$, and a range of linear thermal expansion coefficient of the holder 23 is between $20/(10^6K)$ and $25/(10^6K)$. For example, linear thermal expansion coefficient of aluminum or aluminum alloy material is about $23/(10^6K)$. Therefore, linear thermal expansion of the holder 23 can be omitted as compared with linear thermal expansion of the light guide plate 25.

While the flat display device 20 suffers enormous temperature variation, expansion of the light guide plate 25 will not vary the gap $H_1$ so that the light source module 24 is not pressed by the light incident side $I_1$ of the light guide plate 25 and broken. For example, if the light guide plate 25 is suffering a surrounding temperature change up to 60° C. and linear thermal expansion coefficient of the light guide plate 25 is $85/(10^6K)$, expansion variation of the minimum distance $D_1$ of the light guide plate 25 is between $5.81\times10^{-4}$ mm and $5.81\times10^{-3}$ mm, and is extremely smaller than the gap $H_1$ being between 0.03 mm and 0.3 mm. Due to a slight variation of the minimum distance $D_1$, the gap $H_1$ varies slightly so as to maintain stable luminance of the backlight module 100 without violent variation. Similarly, while the temperature lowers, the light source module 24 can be fixed at a predetermined location without pressing by the light incident side $I_1$. It means that the gap $H_1$ is relatively invariable so that luminance of the backlight module 100 can be more stabilized no matter how the temperature varies.

Figure 5:
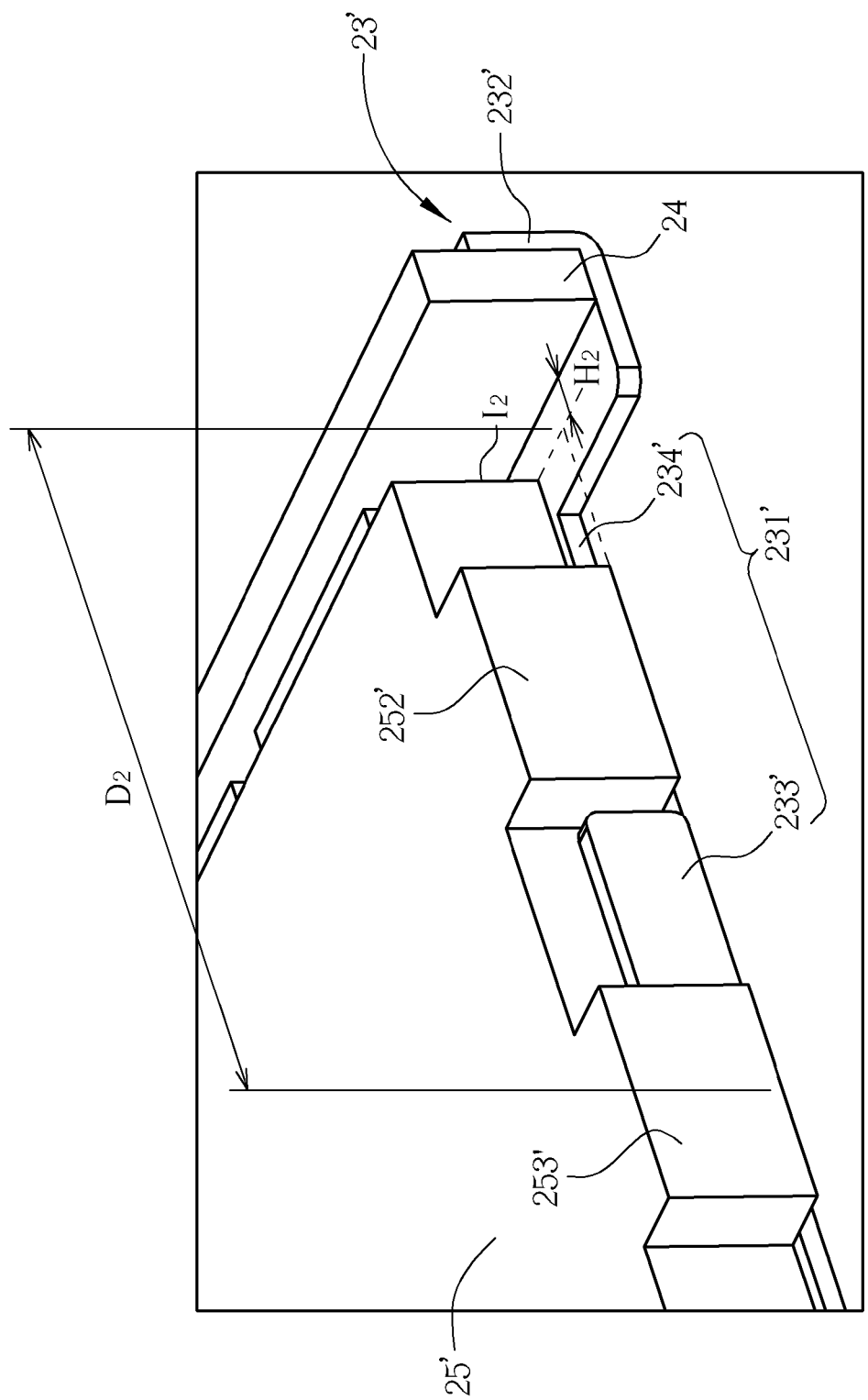
FIG. 5 is a partial diagram of the backlight module according to a second embodiment of the present invention.

Please refer to FIG. 5. FIG. 5 is a partial diagram of the backlight module 100 according to a second embodiment of the present invention. In this embodiment, a holder 23' is used for fixing a gap $H_2$ between a light incident side $I_2$ of a light guide plate 25' and the light source module 24. The light source module 24 can be fixed on a fixing component 232' by gluing, attaching, engaging, or other methods. The fixing component 232' can be an L-shape bending part or a groove-shape bending part. A second baffle 231' (or the retainer) includes a base plate 234' and a second bending part 233' stretched from the base plate 234'. The light guide plate 25' includes two second flanges 252' and 253' (or the second fastening components). The second flanges 252' and 253' are engaged with the second bending part 233' of the second baffle 231' of the holder 23' and limited by the second bending part 233'. The light guide plate 25', the gap $H_2$, and linear thermal expansion coefficient of the holder 23' can be referred as to the corresponding components in the first embodiment. While the light guide plate 25' expands due to heat, the second flange 253' is constrained by the second bending part 233' so that the variation of the minimum distance $D_2$ between a centerline of the second flange 252' and the light incident side $I_2$ varies slightly within the gap $H_2$. While the temperature lowers, the light source module 24 can be maintained at the predetermined location. It means that the gap $H_2$ is relatively invariable so that luminance of the backlight module 100 can be more stabilized no matter how the temperature varies.

Figure 6:
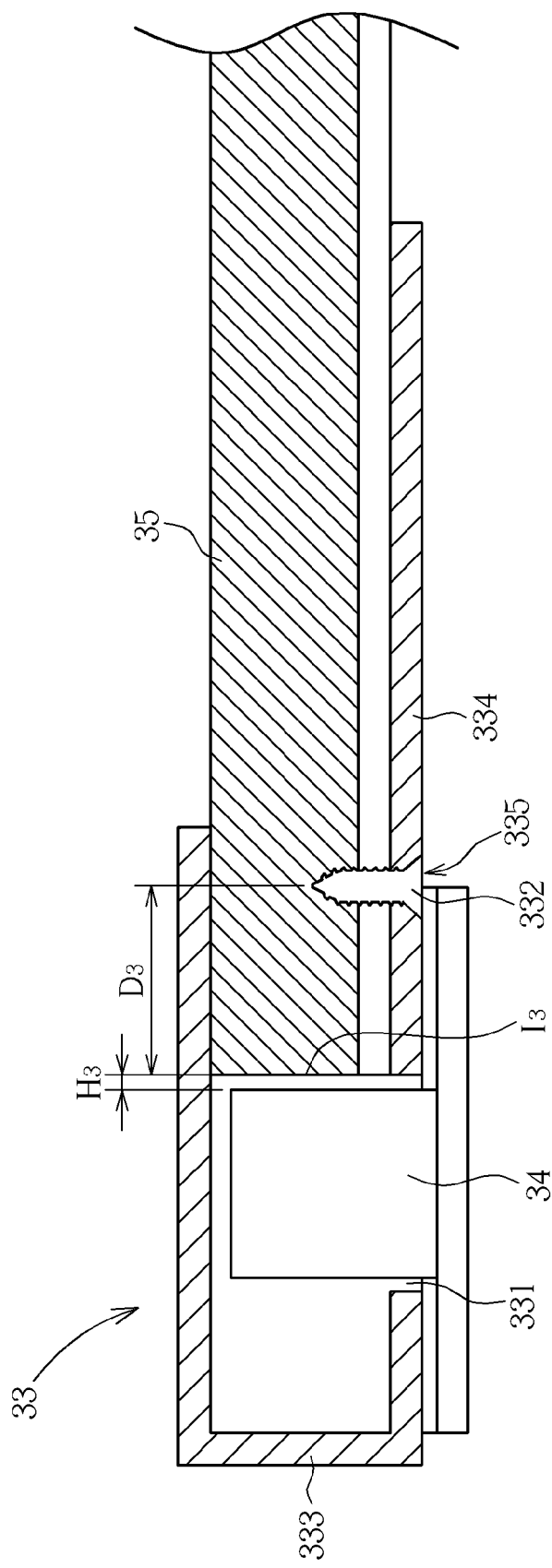
FIG. 6 is a cross-sectional diagram of the backlight module according to a third embodiment of the present invention.

Please refer to FIG. 6. FIG. 6 is a cross-sectional diagram of the backlight module 100 according to a third embodiment of the present invention. In this embodiment, a holder 33 is used for fixing a gap $H_3$ between a light incident side $I_3$ of a light guide plate 35 and a light source module 34. The light source module 34 passes through and is fixed at a groove 331 of a fixing component 333 of the holder 33. A locking component 332 passes through a retainer 335 of the holder 33 and light guide plate 35, and is used for fixing the light guide plate 35 on the holder 33. In this embodiment, the retainer 335 is the hole of the holder 33 or a base plate 334 where the locking component 332 passes through. The light guide plate 35, the gap $H_3$, and linear thermal expansion coefficient of and the holder 33 can be referred as to the corresponding components in the first embodiment. There is a minimum distance $D_3$ between the locking component 332 and the light incident side $I_3$ of the light guide plate 35. While the light guide plate 35 expands due to heat, the locking component 332 is used for controlling expansion of the light guide plate 35 within the gap $H_3$. While the temperature lowers, the light source module 34 can be maintained at the predetermined location. It means that the gap $H_3$ is relatively invariable so that luminance of the backlight module 100 can be more stabilized no matter how the temperature varies.

In addition, the light source module will generate heat while operating. In each embodiment as mentioned above, the holder can be made of thermal material having a thermal conduction coefficient ranging between 220 W/(mK) and 420 W/(mK), such as aluminum or aluminum alloy material. Therefore, thermal energy generated from the light source module fixed on the holder can be dissipated effectively.

Those skilled in the art will readily observe that numerous modifications and alterations of the device and method may be made while retaining the teachings of the invention.

What is claimed is:

1. A backlight module comprising:
   a back plate comprising a fixing component;
   a light guide plate comprising:
      a light incident side; and
      a lateral side connected to the light incident side, the lateral side comprising:
         a first fastening component for engaging with the fixing component of the back plate so as to fix the light guide plate on the back plate; and
         a second fastening component connected to the first fastening component;
   a holder disposed between the back plate and the light guide plate comprising:
      a retainer for engaging with the second fastening component of the light guide plate so as to limit displacement of the light guide plate; and
      a fixing component connected to the retainer; and
   a light source module fixed on the fixing component of the holder, and a gap being formed between the light source module and the light incident side of the light guide plate.

2. The backlight module of claim 1, wherein the first fastening component of the light guide plate and the fixing component of the back plate are formed as wedge structures or engaged rectangular structures engaged with each other.

3. The backlight module of claim 1, wherein the second fastening component of the light guide plate is configured between the light incident side and the first fastening component.

4. The backlight module of claim 1, wherein a range of linear thermal expansion coefficient of the light guide plate is between $80/(10^6K)$ and $85/(10^6K)$.

5. The backlight module of claim 1, wherein a minimum distance between a centerline of the second fastening component and the light incident side is between 7 mm and 70 mm.

6. The backlight module of claim 1, wherein the second fastening component of the light guide plate is a flange and the retainer of the holder is a baffle.

7. The backlight module of claim 6, wherein the baffle further comprises a pair of bending parts for engaging with the flange.

8. The backlight module of claim 1, wherein the second fastening component of the light guide plate is a pair of flanges and the retainer of the holder is a baffle.

9. The backlight module of claim 8, wherein the baffle further comprises a bending part for engaging with the pair of flanges.

10. The backlight module of claim 1, wherein a range of thermal conduction coefficient of the holder is between 220 W/(mK) and 420 W/(mK).

11. The backlight module of claim 1, wherein a range of linear thermal expansion coefficient of the holder is between $20/(10^6 K)$ and $25/(10^6 K)$.

12. The backlight module of claim 1, wherein the fixing component of the holder comprises three walls respectively facing the light incident side and two sides being perpendicular and adjacent to the light incident side, and the light source module is selectively fixed on the three walls.

13. The backlight module of claim 1, wherein the fixing component of the holder has a groove, and the light source module passes through and is fixed at the groove.

14. The backlight module of claim 1 further comprising:
a locking component passing through the retainer of the holder and the light guide plate so as to fix the light guide plate on the retainer.

15. The backlight module of claim 1, wherein a range of the gap is between 0.03 mm and 0.3 mm.

16. A backlight module comprising:
a back plate;
a light guide plate comprising:
a light incident side; and
a lateral side connected to the light incident side and comprising a fastening component;
a holder disposed between the back plate and the light guide plate comprising:
a retainer for engaging with the fastening component of the light guide plate so as to limit displacement of the light guide plate; and
a fixing component connected to the retainer; and
a light source module fixed on the fixing component of the holder, and a gap being formed between the light source module and the light incident side.

17. The backlight module of claim 16, wherein a minimum distance between the fastening component and the light incident side is between 7 mm and 70 mm.

18. The backlight module of claim 16, wherein a range of the gap is between 0.03 mm and 0.3 mm.

19. A flat display device comprising:
a backlight module according to one of claim 1 and claim 16;
a reflector disposed between the back plate and the light guide plate; and
a display panel disposed corresponding to the backlight module.

* * * * *